United States Patent [19]

Chang

[11] Patent Number: 5,007,695
[45] Date of Patent: Apr. 16, 1991

[54] FIBER OPTIC PHASE MODULATOR USING ELECTRO-OPTIC MATERIAL IN EVANESCENT FIELD

[75] Inventor: Chin L. Chang, West Covina, Calif.
[73] Assignee: Honeywell Inc., Minneapolis, Minn.
[21] Appl. No.: 415,014
[22] Filed: Sep. 29, 1989
[51] Int. Cl.$^5$ .............................. G02B 6/00; G02F 1/29
[52] U.S. Cl. .............................. 350/96.14; 350/96.29; 356/350
[58] Field of Search ............... 332/7.51; 455/611, 615; 350/96.14, 96.29; 356/350

[56] References Cited

U.S. PATENT DOCUMENTS

| | | | |
|---|---|---|---|
| 3,954,323 | 5/1976 | Andrews et al. | 350/96.14 |
| 4,268,116 | 5/1981 | Schmadel et al. | 350/96.29 |
| 4,615,582 | 10/1986 | Lefevre et al. | 350/96.29 |
| 4,715,680 | 12/1987 | Kawaguchi et al. | 350/96.14 |
| 4,725,113 | 2/1988 | Chang et al. | 350/96.29 |
| 4,752,120 | 6/1988 | Shimizu | 455/615 |
| 4,850,667 | 7/1989 | Djupsjobacka | 350/96.14 |
| 4,887,900 | 12/1989 | Hall | 356/350 |
| 4,899,042 | 2/1990 | Falk et al. | 250/227.19 |

FOREIGN PATENT DOCUMENTS 178045  4/1986  European Pat. Off.

*Primary Examiner*—Nelson Moskowitz
*Attorney, Agent, or Firm*—Seymour Levine; Albin Medved; Roger W. Jensen

[57] ABSTRACT

A cladded optical fiber is secured in a slot in a substrate which is ground and polished to access the evanescent field. A thin electro-optically active layer of PLZT is deposited on the top of the fiber substrate. A pair of parallel electrodes is then deposited on top of the crystal PLZT film. An electric field distribution parallel to the electro-optical film is generated at the center of the electrode gap by applying a voltage to the electrode pair so as to effect a phase shift of the light wave propagating in the fiber.

7 Claims, 2 Drawing Sheets

FIBER OPTIC PHASE MODULATOR USING ELECTRO-OPTIC MATERIAL IN EVANESCENT FIELD

BACKGROUND OF THE INVENTION

1. Field of the Invention

The invention pertains to the fiber optics technology, particularly with respect to a phase modulator for modulating the phase of light waves propagating in an optical fiber. The invention has particular application in the fiber optics rotation sensor technology.

2. Description of the Prior Art

An all fiber optical phase modulator with a high operating frequency, wide modulation bandwidth and high modulation efficiency (modulation index) is a desideratum that is not available in the prior art. Existing fiber optical phase modulators, such as the PZT stretcher and $PVF_2$ coated fiber, have either narrow bandwidth or poor modulation efficiency. The PZT stretcher phase modulator is constructed by winding the fiber around a piezoelectric cylinder. The cylinder stretches the fiber, changing the fiber length when a voltage is applied to the cylinder electrodes. Such devices exhibit low operating frequency and narrow bandwidth. An optical fiber coated with a piezoelectric plastic jacket, such as $PVF_2$, is also utilized as an optical phase modulator. The piezoelectric jacket squeezes the fiber by applying a voltage across the inner and outer electrodes thereof thereby changing the optical path length and hence modulating the phase. Such devices exhibit low modulation efficiency even though the frequency response thereof is broad. Non-fiber integrated optical devices, such as $LiNbO_3$ channel waveguide phase modulators, are available in the prior art with both high modulation efficiency and wide bandwidth. When endeavoring to insert such devices into the fiber system, the coupling of light to and from the fiber with respect to the device suffers from high insertion loss and large backscattering which generally results in severe instability in the fiber optic apparatus in which the phase shifter is utilized. Additionally, mechanical and thermal instabilities of such devices and the coupling thereof into the fiber system seriously degrade performance of the fiber optical system in which the phase shifter is utilized.

An all fiber phase modulator having a large modulation bandwidth and index is highly desirable in a fiber optical rotation sensor (gyro) for providing dynamic phase bias and closed-loop operation. Such a phase modulator is required to provide a dynamic bias for maximizing the sensitivity of the rotation sensor when it is utilized to measure very small rates. In the closed-loop configuration, a loop closure transducer, such as a frequency or phase shifter, is located at the end of one fiber to produce a non-reciprocal phase shift. The non-reciprocal phase shift offsets the rotation-induced Sagnac effect phase shift. The closed-loop architecture provides a rotation sensor with wide dynamic range from which a digital output can be obtained.

For both the dynamic phase bias and closed-loop applications, an all fiber optical phase modulator having large modulation bandwidth and index is highly desirable in a fiber optical rotation sensor. When endeavoring to utilize the integrated optical devices, as described above, the coupling of light to and from the fiber with respect to the device suffers from high insertion loss and large backscattering resulting in severe instability in the rotation sensor. Additionally, the mechanical and thermal instabilities described above seriously degrade the operation of the sensor. Thus, for the reasons described above, utilization of the prior art phase shifters in the fiber optical rotation sensor is rendered impractical.

It is appreciated that an all fiber optical phase modulator with large modulation bandwidth and index has very significant applications in fiber optical technologies, and in particular, in fiber optical gyros. The fiber optical gyro has the potential to satisfy the performance requirements for high accuracy applications. The closed-loop fiber optical gyro exhibiting large dynamic range and linear output requires a broadband phase modulator or a pure frequency shifter. It is desirable to utilize an all fiber phase modulator or frequency shifter in the closed-loop gyro for the reasons described above. A wide band fiber optic phase modulator capable of providing a large bandwidth and modulation index is suitable for utilization in a closed-loop fiber optic gyro employing the serrodyne modulation technique to shift the optical frequency. Since an all fiber device can be directly spliced into any fiber optical system, the mechanical and thermal instabilities suffered when utilizing the prior art phase modulators can be eliminated and the rate sensor performance substantially improved.

SUMMARY OF THE INVENTION

The above-described disadvantages of the prior art are obviated by an all fiber optic phase shifter utilizing a fiber optic light guide. Electro-optic material is disposed to access the evanescent field of the guided wave propagating in the fiber. Electrodes apply an electric field across the electro-optic material to change the index of refraction thereof because of the electro-optic effect. The propagation velocity of the light is altered because of the variation of the refractive index in the evanescent field region. Thus, the optical path length for the guided wave is altered and the corresponding wave experiences a phase shift.

DESCRIPTION OF THE PREFERRED EMBODIMENT

Figure 1:
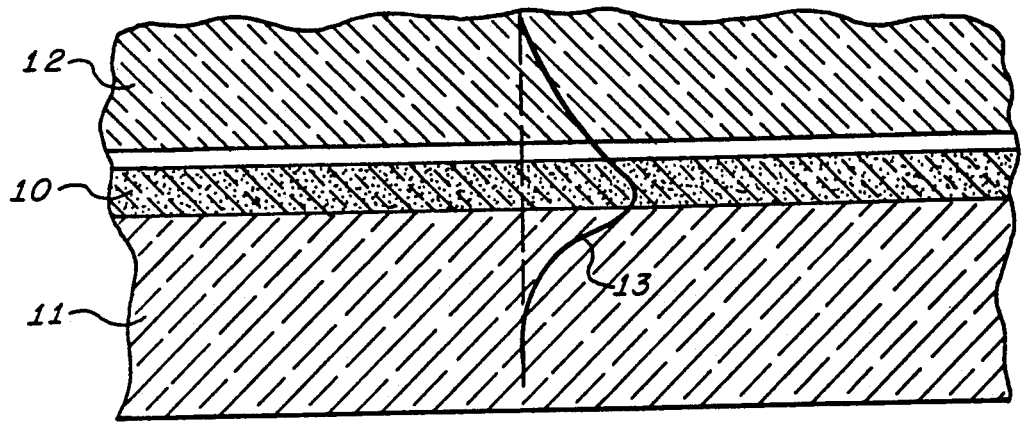
FIG. 1 is a schematic representation of the concept of the present invention of the evanescent field-coupled fiber optical phase modulator utilizing electro-optic crystal.

Referring to FIG. 1, a portion of the phase modulator of the present invention is schematically illustrated showing the concept thereof. The invention is preferably utilized with a cladded optical fiber having a fiber core 10 surrounded by suitable fiber cladding 11. A portion of the fiber cladding material 11 is removed and replaced with electro-optical material 12 to access the evanescent field of the guided wave propagating in the fiber. The material 12 preferably comprises electro-optical crystal material such as lanthanum-modified-leadzirconate-titenate (PLZT). An electric field applied across the electro-optical material 12 changes the propagation velocity of the guided light wave propagating in the fiber because of the variation of the refractive index in the evanescent field region. Thus, the phase of the propagating optical wave is controlled by applying an electric field across the electro-optical material 12. The amount of phase shift is a function of the magnitude of the applied field.

A curve 13 superimposed on the drawing illustrates light amplitude versus radial distance from the center of the fiber core 10. It is appreciated that although most of the light is guided within the core 10, sufficient evanescent field intensity exists in the electro-optical material 12 to effect the phase modulation as described.

Figure 2:
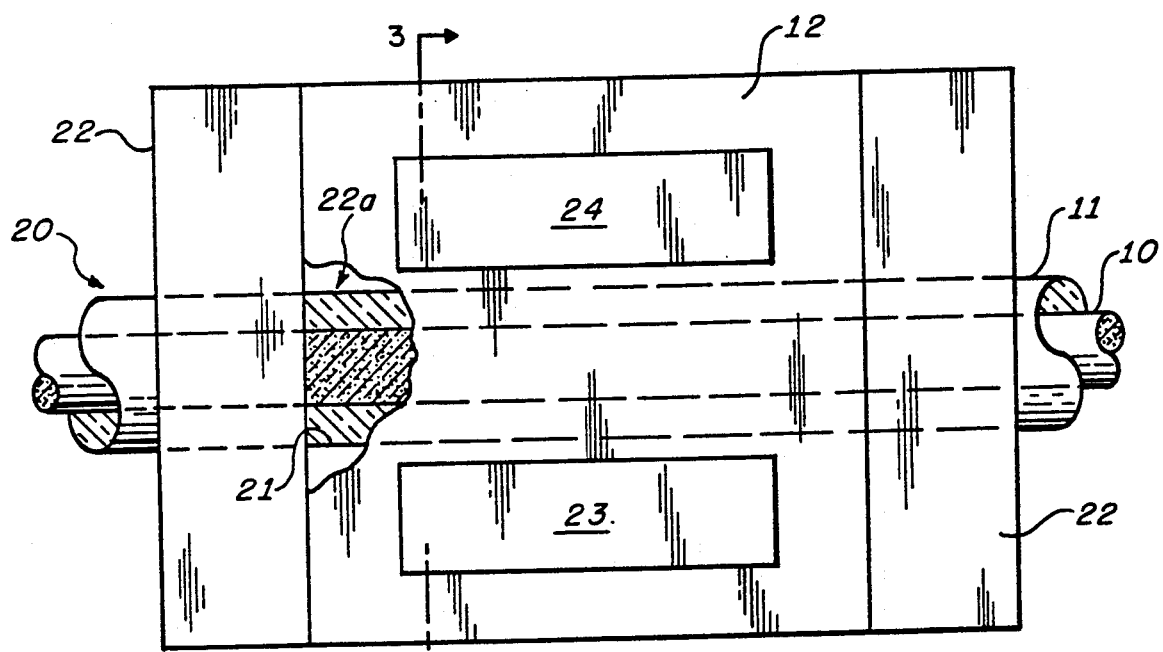
FIG. 2 is a top view of the evanescent field phase modulator utilizing a thin electro-optic crystal film.
Figure 3:
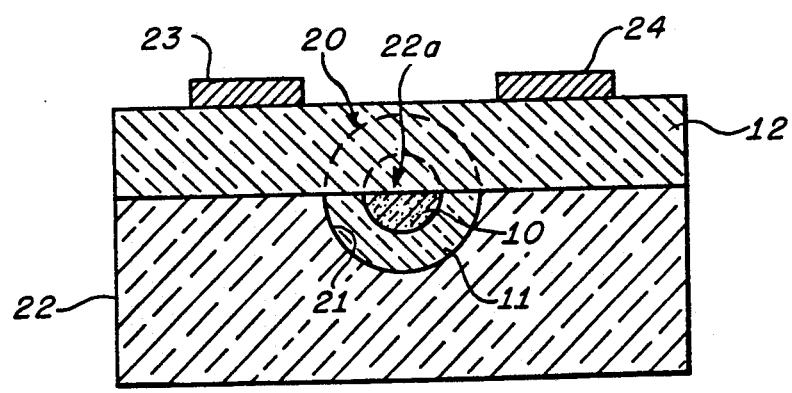
FIG. 3 is a cross-sectional view of the evanescent field phase modulator of FIG. 2.
Figure 4:
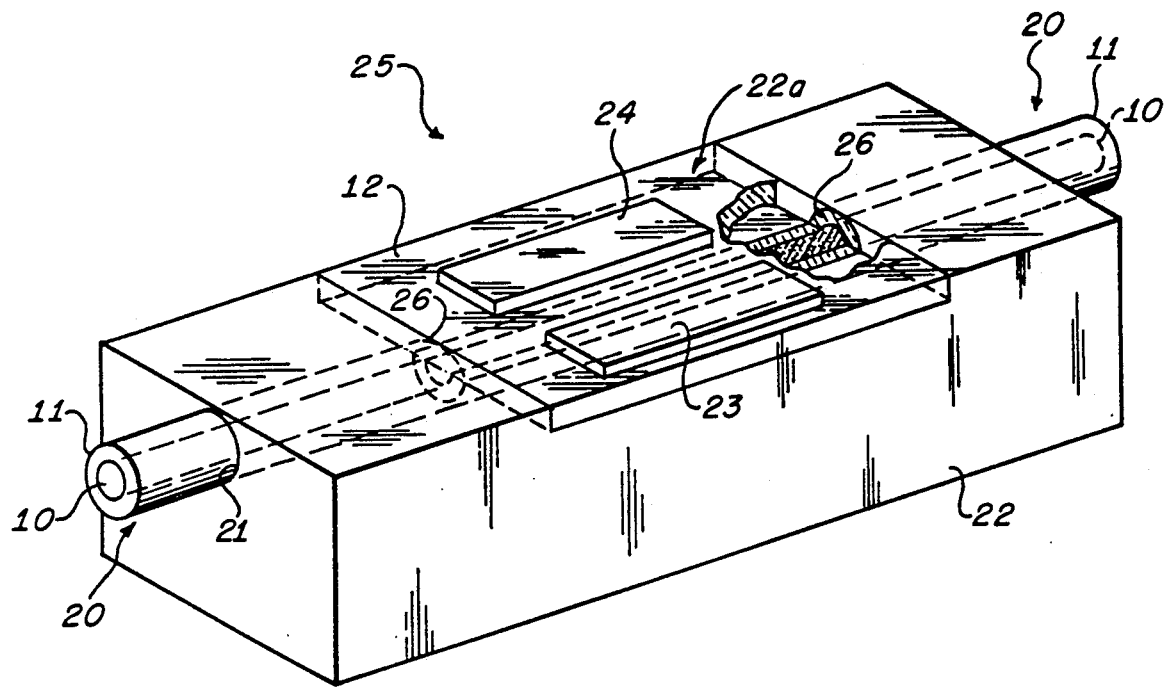
FIG. 4 is a three-dimensional view of the phase modulator of FIGS. 2 and 3.

Referring to FIGS. 2-4, in which like reference numerals indicate like elements with respect to FIG. 1, a preferred embodiment of the invention is illustrated. A cladded optical fiber 20 is secured into a slot 21 in a suitable substrate 22. The substrate 22 may, for example, comprise fused quartz or other types of optical glass and the fiber 20 is preferably bound into the slot 21 by an adhesive material such as ultra-violet curable epoxy. The optical fiber 20 and substrate 22 is then ground and polished to remove a portion of the fiber cladding material to the extent that the evanescent field is optimally accessed. Preferably, the grinding and polishing is performed down to the center of the cladding 11 and core 10. In this manner, optimum coupling to the evanescent field is effected. The electro-optic crystal 12 is then disposed on top of the fiber 20 and substrate 22. The crystal 12 is preferably a thin layer of PLZT film that is electro-optically active and is deposited on top of the fiber 20 and substrate 22 by, for example, RF magnetron sputtering or ion beam deposition. A large electro-optical effect is obtained for the PLZT film 12 by carefully controlling the stochiometry during the crystal growth process. As is appreciated, a polycrystalline material can conventionally be deposited on a substrate of non-crystalline material. The electro-optical effect is, however, still adequate for the phase modulator application.

A pair of parallel electrodes 23 and 24 are then deposited on top of the crystal film 12 by, for example, conventional photolithography techniques. An electric field distribution parallel to the electro-optical film 12 is generated at the center of the electrode gap by applying a suitable voltage to the electrode pair 23, 24.

With reference to FIG. 4, the elements 12, 22, 23 and 24 form a phase modulator 25 for the light wave propagating along the optical fiber 20. The optical fiber 20 is positioned to a depth in the substrate 22 sufficient to have it submerged therein for its entire diameter. The substrate and optical fiber are then ground and polished, over a region 22a, so that the evanescent field can be easily accessed. Though the grinding and polishing are to the center of the core 10 in FIG. 4, it should be recognized that the evanescent field may be accessed with the removal of the cladding to a lesser depth. A layer of PLZT film is then deposited on the substrate to cover the core 10 to a height that is approximately equal to the radius of the optical fiber. This construction provides a high efficiency device since little light is lost at the transitions 26. After the PLZT layer has been applied, the electrodes 23 and 24 are deposited thereon.

Because the linear electro-optical effect experienced by the crystal 12 is essentially caused by electronic lattice transitions, the response time of the refractive index change approaches the electronic lattice relaxation time which is in the range of $10^{-13}$ to $10^{-14}$ seconds. Thus, in practical applications of the device, the frequency response of the electro-optical effect may be considered as unlimited. The bandwidth of the electro-optical device is limited by the optical transit time or the velocity mismatch between the optical beam and the applied electrical signal. The optical transit time t is given by:

$$t = nl/c$$

where
n is the refractive index of the material 12,
l is the interaction length, and
c is the velocity of light in vacuum.

It is desirable that during one unit of optical transit time, the applied electric field shall not vary significantly in order to fully utilize the entire interaction region. Thus, the upper cut-off frequency of the electrical signal is limited by the following relation:

$$t << 2\pi/W$$

where W is the angular frequency of the electrical signal.

Figure 5:
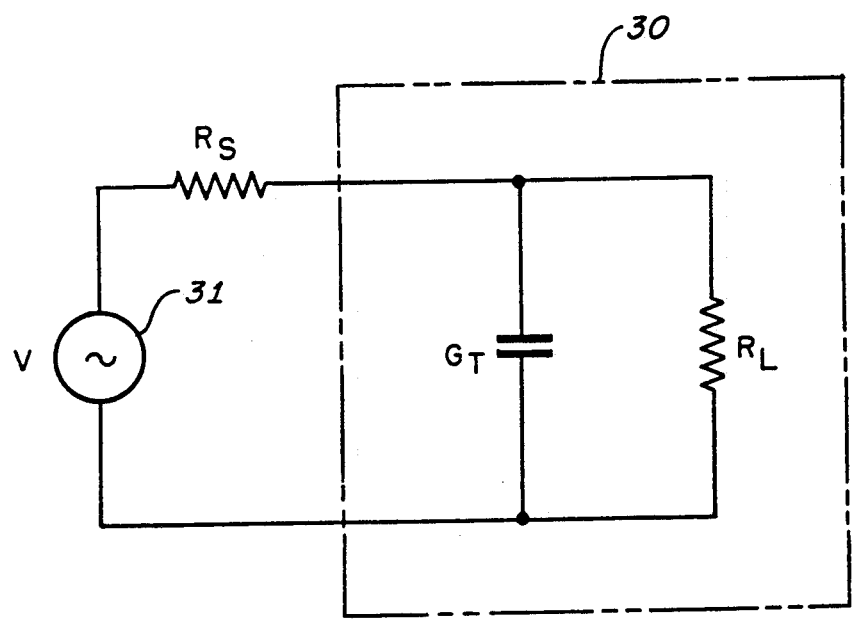
FIG. 5 is a lumped constant type equivalent circuit for the electro-optical phase modulator of the present invention useful in discussing properties thereof.

Referring to FIG. 5, the lumped equivalent circuit 30 is useful in discussing the performance of the device illustrated in FIGS. 2-4. The bandwidth of this circuit is given by:

$$BW = 1/[\pi R_L C_T]$$

where
BW is $(\Delta)f$ at the 3dB points,
$R_L$ is the load resistance for matching the source impedance $R_S$ of the alternating voltage source 31 and
$C_T$ is the capacitance contributed by the combination of the electro-optical crystal 12 and the electrodes 23, 24.

Generally, the capacitance associated with the electrodes 23, 24 is very small resulting in a bandwidth in the gigahertz range.

Thus, a fiber optic phase modulator is implemented by removing a portion of the fiber cladding and replacing the removed cladding with an electro-optical material to access the evanescent field of the guided wave propagating in the fiber. An applied electric field across the electro-optical material changes the propagation velocity of the guided light because of the variation of the refractive index in the evanescent field region. The present invention provides a wideband, all fiber electro-optical phase modulator having a large modulation index. A large modulation bandwidth can be achieved because of the utilization of the electro-optical material. Thus, the electro-optical device of the present invention advantageously provides large operating bandwidth and high modulation efficiency. Additionally, the invention provides an all fiber device utilizing the conventional single mode fiber and is readily spliced into a fiber optical system with an exceedingly low splicing loss. A mechanically stable fiber optical system, such as a fiber gyroscope, is obtainable utilizing the present invention. The invention can be used in a closed-loop fiber optical gyroscope utilizing the serrodyne modulation technique. Mechanical and thermal instabilities are eliminated and gyro performance substantially improved compared to prior art arrangements.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A phase modulator for use with an optical fiber having a fiber core and cladding, a light wave propagating in said fiber core having an evanescent field in said cladding, comprising electro-optical material disposed proximate said fiber core to access said evanescent field, said electro-optic material having a variable index of refraction, the propagation velocity of said light wave being determined by said index of refraction, and electrode means disposed proximate said electro-optic material to apply an electric field having an electric field distribution thereacross that is parallel to said electro-optic material, said electric field arranged to vary said index of refraction and said propagation velocity of said light wave in accordance with applied electric field, thereby modulating the phase of said light wave.

2. The modulator of claim 1 wherein said electro-optical material comprises electro-optical crystal material.

3. The modulator of claim 2 wherein said electro-optical crystal material comprises PLZT.

4. The modulator of claim 1 further comprising a substrate with a slot therein, said optical fiber being disposed in said slot, said optical fiber having said cladding removed in a region so as to access said evanescent field.

5. The modulator of claim 4 wherein said electro-optical material comprises a film of electro-optical crystal disposed on said substrate.

6. The modulator of claim 5 wherein said electrode means comprises electrodes disposed on said electro-optical crystal film so as to apply said electric field across said electro-optical crystal film in the vicinity of said evanescent field.

7. The modulator of claim 6 wherein said electro-optical crystal film comprises an electro-optically active film of PLZT.

* * * * *